United States Patent Office 3,379,506
Patented Apr. 23, 1968

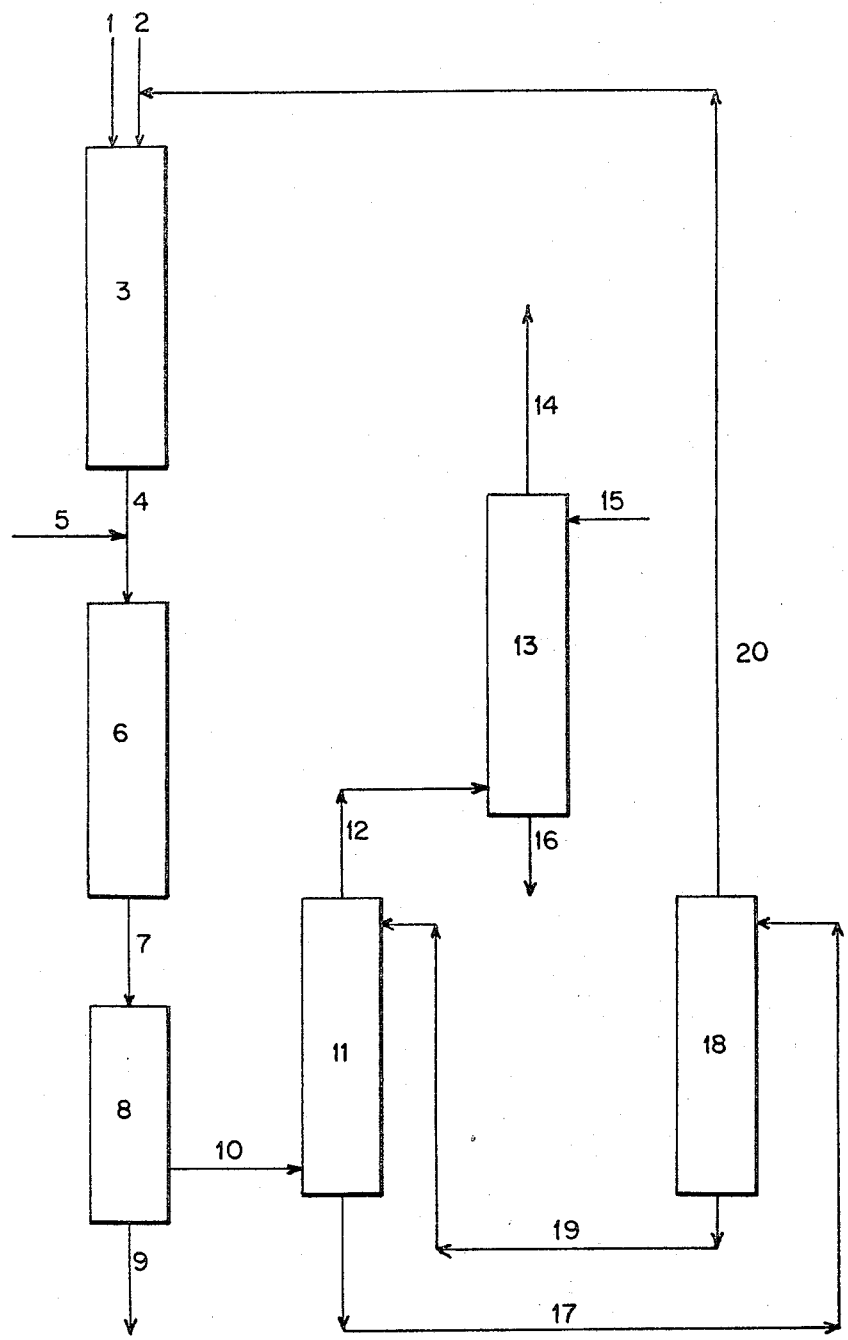

3,379,506
BROMINE RECOVERY
Joachim Massonne and Boris Meyer, Hannover, Germany, assignors to Kali-Chemie Aktiengesellschaft, Hannover, Germany
Filed July 1, 1965, Ser. No. 468,760
Claims priority, application Germany, July 6, 1964, K 53,394
4 Claims. (Cl. 23—216)

ABSTRACT OF THE DISCLOSURE

Hydrogen bromide in the bromination gases of fluorohydrocarbons is selectively oxidized and converted within such gases, without separation to bromine by passing the entire gas mixture over a Deacon catalyst.

---

This invention relates to the recovery of bromine from the hydrogen bromide contained in gases coming from the bromination of fluorinated hydrocarbons.

It is known to brominate thermally polyhalogenated hydrocarbons which contain at least one hydrogen and one fluorine atom, such as trifluoromethane, difluoromethane, or difluorochloromethane. The bromination of difluorochloromethane proceeds according to the equation (1) $\quad CHClF_2 + Br_2 \rightarrow CBrClF_2 + HBr$ 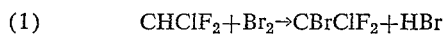

By-products formed are difluorodibromomethane, difluorodichloromethane, and hydrogen chloride, as well as other compounds. The obtained reaction mixture is washed, in accordance with conventional procedures for the removal of hydrogen bromide and chloride, with water and caustic soda. The hydrobromic acid or sodium bromide solution, respectively, thus obtained is contaminated with hydrogen chloride and small amounts of hydrogen fluoride and, before it can be used, must be subjected to lengthy purification procedures, or it must be processed with chlorine in an expensive operation for the recovery of bromine.

In order to use the bromine as fas as possible for the bromination of the substituted hydrocarbon, it has been proposed to employ the bromine together with oxygen, so as to produce, by way of the so-called oxybromination, in the presence of vanadium oxide containing catalyst, the following reaction:

(2) $\quad 4CHClF_2 + 2Br_2 + O_2 \rightarrow 4CBrClF_2 + 2H_2O$ 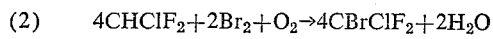

This reaction, however, is accompanied by various decomposition reactions which increases the formation of hydrogen fluoride and reduce the yield. In addition, the reaction requires temperatures of 450 to 500° C. where, in presence of oxidation catalyst, oxygen, and water vapor, undesirable side reactions take place which further decrease the yield of brominated products. Furthermore, as vanadium pentoxide is volatile with hydrogen bromide or bromine at 450 to 550° C., great catalyst losses take place in the reaction.

We have found that the bromine of the hydrogen bromide produced in Reaction 1 can be recovered without previous separation from the gaseous reaction mixture when this mixture is treated at elevated temperatures with oxygen or oxygen containing gases, such as air, in the presence of an oxidation catalyst of the type of Deacon catalyst. If the bromination according to Equation 1 is carried out with a rather large excess of bromine, it may be of advantage to condense part of the bromine by cooling., e.g to room temperature. The Deacon catalysts consist usually of a mostly porous carrier such as pumice, alumina, silica gel, clay, or bentonite, impregnated with a solution of bromides or chlorides of metals such as copper, iron, titanium, vanadium, chromium, manganese, cobalt, molybdenum, tungsten, or mixtures thereof. We prefer the chlorides of copper. A very efficient and stable catalyst is an oxidation catalyst which is prepared by impregnating active alumina with chlorides of copper, rare earths and/or alkali metals, drying at about 120° C. and subsequent activation at a temperature of 300 to 450° C. However, also other known oxidation catalysts of this type may be employed.

The oxidation of the hydrogen bromide contained in the gas mixture, to bromine is carried out in the temperature range of 250 to 500° C., preferably between 300 to 400° C. In order to obtain an optimum conversion to bromine, it is necessary to pass at least the stoichiometric amount of oxygen required for the oxidation together with the reaction gases over the catalyst. We have found it of advantage to employ the oxygen in an excess of 5 to 20 percent over the stoichiometric amount. Generally, we prefer to use pure oxygen for our process. However, also gases containing molecular oxygen, for instance air, can be employed. Preferably, the process is carried out as a continuous operation where the recovered bromine is recycled into the bromination reaction.

In order to recover the bromine from the reaction gases leaving the oxidation zone, the gases may be cooled to room temperature. Thereby, the water of reaction, unreacted hydrogen bromide, hydrogen chloride, and hydrogen fluoride, traces of which may be present, are precipitated. At the same time, a part of the bromine is condensed which can be recovered by phase separation from the aqueous phase. For complete removal of the bromine, the cooled reaction gases are passed through a washer which contains a solvent which is selective for bromine, such as dibromoethane, tetrabromoethane, bromobenzene, or alkali metal bromide solutions. Bromine is recovered from such solutions by distillation.

Tests have confirmed that our process allows of converting hydrogen bromide contained in the gaseous mixtures referred to hereinabove is substantially completely converted to bromine. The process is very economic because cheap oxygen is used instead of expensive chlorine and because no interfering by-products are obtained. The analysis of the remaining gas shows that the treatment with oxygen in presence of the oxidation catalyst has not changed the composition of the fluorobromo or fluorobromochlorohydrocarbon mixtures. Neither are these losses by decomposition.

The process of the invention will be apparent from the following description when read in connection with the drawing, the single figure of which illustrates diagrammatically an assembly of apparatus suitable for carrying out the process. In the following description, the process is described as applied to the recovery of bromine from the hydrogen bromide produced as a by-product, in the bromination of halogenated hydrocarbons, without previous separation of said hydrogen bromide, and to the continuous recycling of the thus recovered bromine into the bromination reaction.

In the drawing, 3 indicates the reactor which received the bromine through line 2, and the halogenated hydrocarbons to be brominated through line 1. The brominated reaction gases containing hydrogen bromide leave the reactor through line 4 and are passed into reactor 6 which is charged with an oxidation catalyst. The required amount of oxygen or air is introduced through line 5. The reaction gases leave the oxidation reactor 6 through line 7 and pass into a cooler 8 in which the gas mixture is cooled to room temperature (15–30° C.). Thereby the water of reaction, unreacted hydrogen bromide, hydrogen chloride, hydrogen fluoride if present, and a portion of the bromine are condensed and withdrawn through line 9. The recovery of the bromine takes place by phase separation from the aqueous phase. The recovered bromine is returned to line 2 (not shown).

The cooled reaction gases are passed through line 10 into a washer 11 which contains a solvent selective for bromine, e.g., dibromoethane or bromobenzene. The solvent is introduced through line 19, passes through the washer in countercurrent to the reaction gases, and is introduced through line 17 into a stripper 18 in which the bromine is driven off and returned through line 20 to line 2. The bromine solvent is regenerated and returned to the absorption through line 19.

The reaction gases, which are now freed from the major portion of bromine, are passed for removal of residual bromine and halogenated hydrocarbons from washer 11 through line 12 into a washer 13 where they are treated with water or alkali metal hydroxide. The used up washing solution is withdrawn through line 16. The purified gases are withdrawn through line 14 and can then be compressed and separated in their constituents.

Example 1

In carrying out our process in the above described apparatus, the oxidation catalyst for reactor 6 was prepared as follows:

1000 g. of granulated active alumina, grain size 0.5 to 2.0 mm., were impregnated with a solution containing in 1000 g., 49.5 g. of potassium, 79.0 g. of copper, and 79.5 g. rare earths of the cerite group as chlorides. Subsequently, the catalyst was dried at 120° C. and activated by heating at 450° C.

A gas mixture obtained by the bromination of difluoromonochloromethane and having the following percentage by volume composition.

| | Percent |
|---|---|
| HBr | 44.3 |
| HCl | 4.2 |
| $Br_2$ | 2.2 |
| $CF_2ClBr$ | 43.7 |
| $CF_2Br_2$ | 3.3 |
| $CF_2ClH$ | 1.9 |
| $CF_2BrH$ | 0.5 |
| $CF_2Cl_2$ | 0.1 |
| $CF_3Cl$ | 0.05 | was continuously mixed with oxygen in such amounts that 11.8 liter of oxygen were admixed to 100 liter of the gas mixture. The obtained oxygen containing gas mixture was passed in the reactor 6 over a cylindrical layer of 44 cm. length and 4.5 cm. diameter of the above described oxidation catalyst, which was heated to 350° C. 240 liter of the gas mixture were passed over the catalyst within 2 hours. Cooling of the gas leaving the catalyst condensed the reaction water with a content of 17.2 g. of HCl and 1.8 g. of HBr. The total amount of bromine, which was obtained by cooling the reaction gases to the ambient temperature and washing with dibromoethane, was 351 g., corresponding to a conversion of 99% of the hydrogen bromide contained in the starting gas mixture, to bromine.

The residual gas mixture had a volume of 108 liter of the composition:

| | Percent |
|---|---|
| $O_2$ | 2.4 |
| $CF_2ClBr$ | 84.5 |
| $CF_2Br_2$ | 7.5 |
| $CF_2HCl$ | 2.7 |
| $CF_2HBr$ | 0.6 |
| $CF_2Cl_2$ | 1.6 |
| $CF_3Cl$ | 0.5 |

Example 2

A gas mixture obtained by bromination of trifluoromethane and having the composition by volume

| | Percent |
|---|---|
| HBr | 47.5 |
| $Br_2$ | 2.5 |
| $CF_3Br$ | 47.0 |
| $CF_3H$ | 3.0 |
| $CF_2Br_2$ | 0.02 | was mixed with oxygen in such an amount that 14.3 liter of oxygen were added to 100 liter of the gas. The thus obtained oxygen containing gas mixture was passed over the catalyst of Example 1 which was kept at a temperature of 400° C. After a reaction of 230 liter of the gas in 1 hour and separation of the water of reaction, which contained 2.1 g. of hydrogen bromide, there were obtained 352 g. of bromine, again corresponding to a yield of 99%, calculated on the introduced hydrogen bromide.

The remaining gas mixture has a volume of 102 liter and consisted of

| | Percent |
|---|---|
| $O_2$ | 4 |
| $CF_3Br$ | 91 |
| $CF_3H$ | 5 |

We claim:
1. A method for recovering bromine from gas mixtures obtained by the bromination of fluorohydrocarbons where the hydrogen of the fluorohydrocarbons is substantially substituted by bromine with formation of hydrogen bromide, comprising passing the entire brominated gas mixture together with oxygen at a temperature of 250 to 500° C. over a Deacon catalyst comprising a porous support impregnated with a metal salt, thereby oxidizing selectively said hydrogen bromide to bromine.

2. The method as claimed in claim 1 wherein said Deacon catalyst consists of porous support impregnated with the chlorides of copper.

3. The method as claimed in claim 1 wherein said Deacon catalyst consists of alumina impregnated with a chloride of copper and additionally with at least one chloride of at least one metal of the group consisting of rare earth metals and alkali metals.

4. The method as claimed in claim 1 including the steps of cooling the gases leaving the catalyst, passing the gases through a selective bromine solvent, and returning the bromine recovered by cooling and solution into the bromination.

References Cited

UNITED STATES PATENTS

| 2,163,877 | 6/1939 | Hooker | 23—216 |
| 2,204,733 | 6/1940 | Miller | 23—219 |
| 2,536,457 | 1/1951 | Mugdan | 23—216 |
| 3,084,028 | 4/1963 | Foulletier et al. | 23—216 |
| 3,107,154 | 10/1963 | Schachter et al. | 23—216 X |
| 3,210,430 | 10/1965 | Knight | 23—216 X |

OSCAR R. VERTIZ, *Primary Examiner.*

EDWARD STERN, MILTON WEISSMAN, *Examiners.*